United States Patent [19]

Foley

[11] Patent Number: 4,676,148

[45] Date of Patent: Jun. 30, 1987

[54] COFFEE-MAKING MACHINES

[75] Inventor: Henry L. Foley, Chatam, Ill.

[73] Assignee: Bunn-O-Matic Corporation, Springfield, Ill.

[21] Appl. No.: 855,837

[22] Filed: Apr. 24, 1986

[51] Int. Cl.⁴ .............................................. A47J 31/00
[52] U.S. Cl. ........................................ 99/279; 99/295; 403/260
[58] Field of Search .......................... 99/279, 280–283, 99/295, 300, 304, 306; 426/433; 403/378, 256, 260

[56] References Cited

U.S. PATENT DOCUMENTS

| 3,220,334 | 11/1965 | Martin | 99/307 |
| 3,385,201 | 5/1968 | Martin | 99/295 |
| 3,450,024 | 6/1969 | Martin | 99/295 |
| 3,793,934 | 2/1974 | Martin | 99/304 |
| 4,476,775 | 10/1984 | Daugherty | 99/304 |
| 4,503,757 | 3/1985 | Daugherty | 99/295 |

Primary Examiner—Robert W. Jenkins
Attorney, Agent, or Firm—Lockwood, Alex, FitzGibbon & Cummings

[57] ABSTRACT

Disclosed are improvements in a coffee-making machine of the type having an elevated cool or cold water basin from which cool or cold water drains into a fill tube extending down to adjacent the bottom of a hot water reservoir, the fill tube being suspended from the underside of the cover or lid on the reservoir. The cool or cold water displaces hot water to a spray head disposed over a brewing funnel. One specific improvement pertains to the means by which the cold water basin is attached to the reservoir lid. Another specific improvement pertains to the means by which the upper end of the fill tube is suspended from the reservoir lid. The combination of these improvements provides a convenient, secure and economical means of assembling these related components of the coffee-making machine.

6 Claims, 9 Drawing Figures

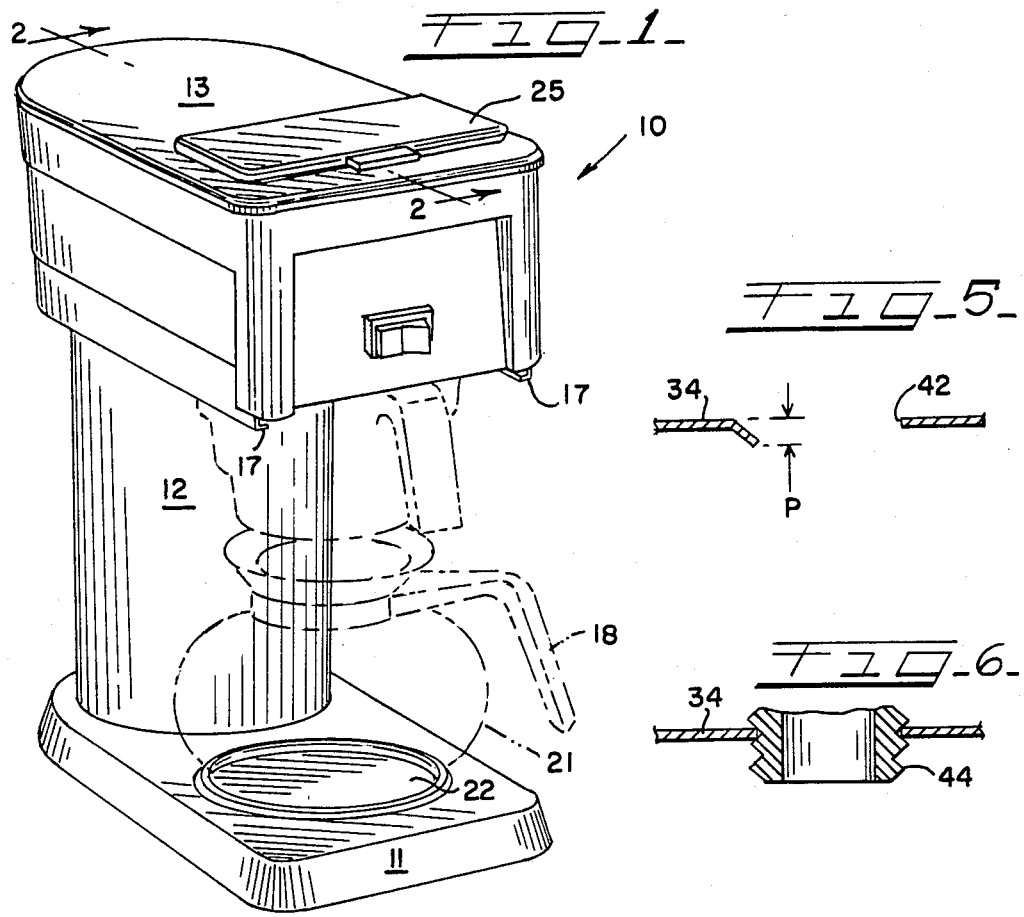
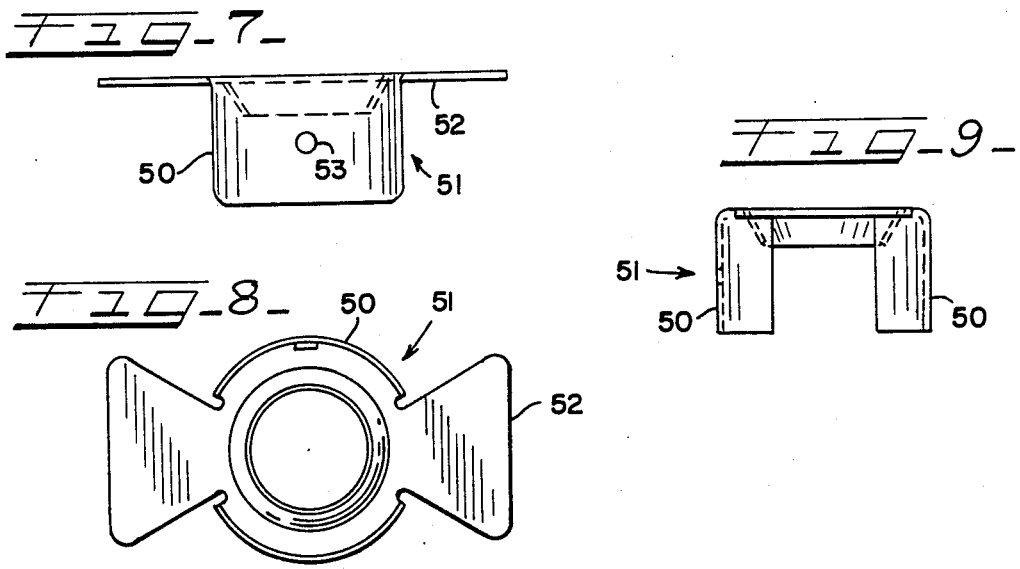

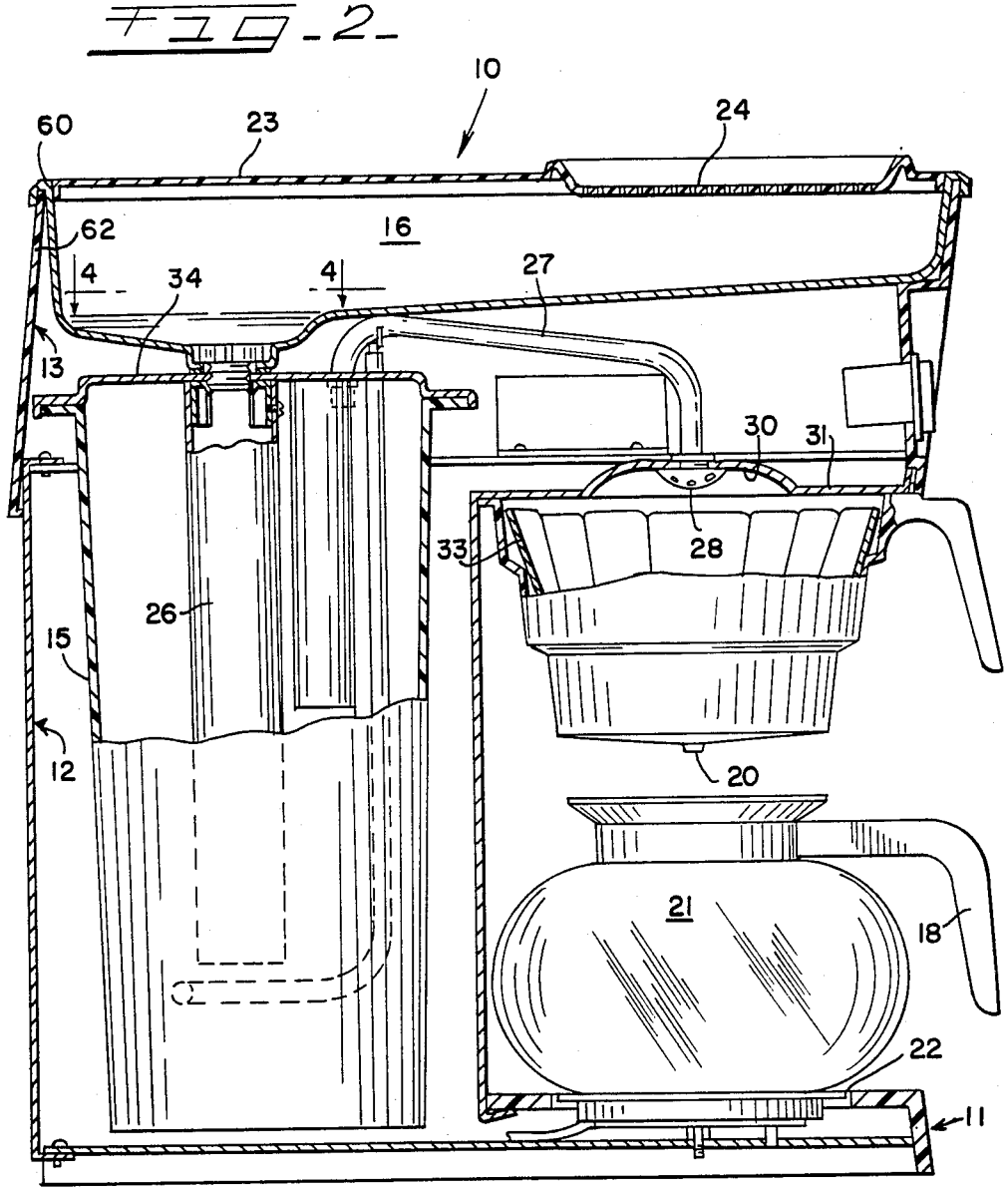

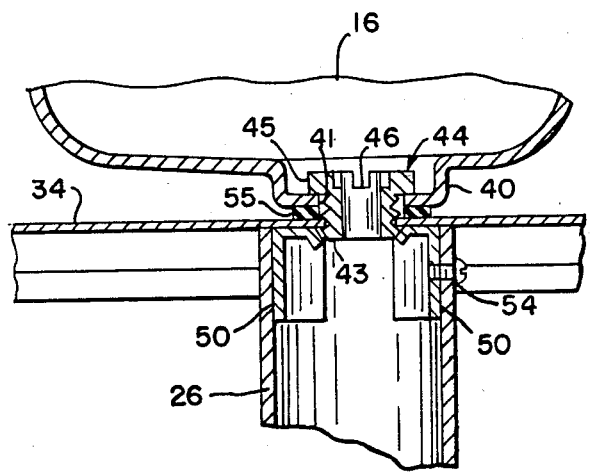
FIG-3-
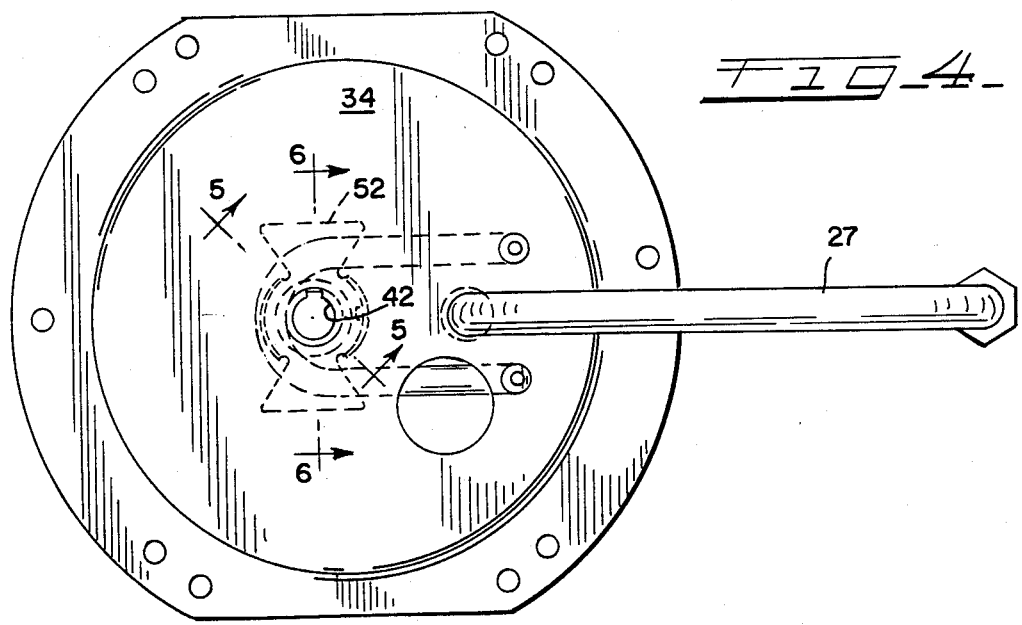
FIG-4-

COFFEE-MAKING MACHINES

This invention relates, generally, to innovations in coffee-making machines or brewers of the general type that have a cold (or cool) water basin mounted on top of a hot water tank or reservoir and wherein cold water flows or drains by gravity from the basin into the upper end of a fill tube which extends to adjacent the bottom of the hot water reservoir. The cold water which discharges from the bottom end of the fill tube displaces an equal volume of hot water from the top of the reservoir into a hot water siphon tube having a sprayhead on its down-turned discharge end. The displaced hot water sprays onto ground coffee supported on a paper filter lining the interior of a brewing funnel. Brewed coffee discharges from an outlet opening in the bottom of the funnel into a decanter resting on a warmer.

Coffee-making machines of the foregoing type are disclosed in the following patents to J. C. Martin: U.S. Pat. Nos. 3,385,201 May 28, 1968; 3,494,276 Feb. 10, 1970; 3,736,155 May 29, 1973; 3,793,934 Feb. 26, 1974 and 4,094,233 June 13, 1978; D. L. Daugherty U.S. Pat. No. 4,414,552 Nov. 8, 1983; K. W. Stover U.S. Pat. No. 4,464,981 Aug. 14, 1984; D. L. Daugherty U.S. Pat. No. 4,476,775 Oct. 6, 1984; J. D. Zimmerman U.S. Pat. No. 4,478,139 Oct. 23, 1984; and D. L. Daugherty U.S. Pat. No. 4,503,757 Mar. 12, 1985.

More particularly, the present inventions relates to both (1) novel means for detachably mounting the cold water basins on the covers or lids on the hot water reservoirs of coffee-making machines of the foregoing type, and (2) novel means for suspending the fill tubes from the undersides of the covers or lids so as to receive the cold water from the cold water basin. In the coffee-making machines disclosed in the above-identified patents and in known commercial coffee-making machines, several different satisfactory means have been used for the foregoing purposes. The novel means of the present invention are more economical than the prior means in respect to component cost and ease of assembly in production, and result in products equal to or better quality than those of the prior art.

For a more complete understanding of the nature and scope of the invention reference may now be had to the following detailed description of a preferred and illustrative embodiment taken in connection with the accompanying drawings, wherein:

FIG. 1 is a perspective view of a coffee-making machine embodying the present invention;

FIG. 2 is a sectional view taken on line 2—2 of FIG. 1 and partly in elevation;

FIG. 3 is a fragmentary view on enlarged scale of a portion of the view shown in FIG. 2;

FIG. 4 is a fragmentary plan view taken on line 4—4 of FIG. 2;

FIG. 5 is a detail sectional view on enlarged scale taken on line 5 of FIG. 4;

FIG. 6 is a detail sectional view on enlarged scale taken on line 6—6 of FIG. 4;

FIG. 7 is an elevational view of the retainer used in the assembly of the cold water fill tube to the reservoir lid in the coffee brewing machine as shown in FIG. 3;

FIG. 8 is a top plan view of the retainer shown in FIG. 7; and,

FIG. 9 is an elevational view taken on line 9—9 of FIG. 7.

In FIGS. 1 and 2 a coffee-making machine is indicated generally at 10 which has a base indicated generally at 11, a trunk indicated generally at 12 and a superstructure indicated generally at 13. In addition to supporting the superstructure 13, the trunk 12 also provides a housing for a hot water reservoir or tank 15. The superstructure 13 houses a cold or cool water basin indicated generally at 16 and has a overhang or cantilever portion underneath which a pair of guide and support rails 17—17 are attached so as to support a brewing funnel indicated generally at 18. Fresh brewed coffee discharges from a center outlet 20 in the bottom of the funnel 18 into a carafe or decanter 21 which rests on a warmer 22 located in the platform 11.

The top wall 23 of the superstructure 13 serves as a cover for the cold water basin 16 and is provided with a pour-in opening in the form of a screen 24 which is provided with a hinged cover 25 (FIG. 1). The cold water poured into the basin 16 drains by way of a fill tube 26 into the lower portion of the hot water reservoir 15. As the cold or cool water enters or discharges into the bottom of the hot water tank 15 it displaces hot water from the upper portion which flows through a hot water siphon tube 27 to a sprayhead 28 positioned underneath a raised portion 30 in the bottom of wall 31 on the overhang portion of the superstructure 13.

Hot water from the sprayhead 28 discharges onto ground coffee resting on a disposable fluted paper filter 33 lining the funnel 18.

The foregoing construction and operation of the coffee brewing machine 10 are well known and described in the above-listed patents.

As stated above, the present invention is directed to improved means for mounting the cold water basin 16 on the cover lid 34 of the hot water tank or reservoir 15 and of supporting the fill tube 26 from the underside of the lid 34. For a detailed description of this improved mounting, connecting and supporting means reference may now be had particularly to FIGS. 3-9.

The cold water basin 16 can be formed of plastic or metal. However, in commercial production there are advantages in injection molding the cold water basins 16 from suitable known plastic materials. The basin 16 is formed with a sump 40 (FIG. 3) with a central drain opening 41 in its bottom. The location of the sump 40 is such that it is in registration or centered over the cold water fill tube 26. Since cold water flows or drains from the basin 16 downwardly into the fill tube 26, it is necessary to provide for fluid flow communication between the opening 41 in the sump 40 and the upper end fill tube 26. It is also required to suitably suspend or support the fill tube 26 by its upper end underneath the cover lid 34 of the hot water reservoir or tank 15.

A key feature of construction for connecting the bottom of the sump 40 and the drain opening 41 therein with the upper end of the fill tube 26 is a specially formed opening 42 (FIG. 4) in the lid 34. While the lid 34 can be formed of either plastic or metal it is preferably formed of sheet metal which is economical and lends itself to production in large quantities at low cost and with a high degree of accuracy. The opening 42 is formed in such a way that it constitutes an integrally formed nut of approximately one, but not exceeding one, thread and with an axial length of not exceeding one pitch. The circular edge of the material forming the opening 42 is of such internal diameter and configuration as to mate with one exterior thread on the shank 43 of a tubular bolt indicated generally at 44 (FIG. 3).

Preferably, the opening is interrupted by a notch 39 (FIG. 4) which serves a pilot opening for shank 43 of bolt 44. The head 45 of the bolt 44 is provided with a pair of diametrically opposed notches or slots 46. These slots 46 permit the bolt 44 to be rotated for tightening or loosening by inserting a tool or straight object between the two opposing slots 46.

It will be seen from FIG. 3 that the length of the shank 43 on the tubular bolt 44 is such that the end of the bolt projects below the underside of the lid 34 at appreciable distance. This allows water from the basin 16 to discharge into the upper end of the fill tube 26 which is received telescopically over a pair of semicylindrical flanges 50 integrally formed as part of a stamping indicated generally at 51 in FIGS. 7–9. When the lid 34 is formed of sheet metal, the stamping 51 is also likewise formed of sheet metal so that the diametrically opposed horizontal wings 52—52 can be spot welded to the underside of the lid 34.

An aperture 53 (FIG. 7) is formed in one of the semicylindrical flanges 52 and the corresponding opening is formed in the upper end of the fill tube 26 for accepting a self-tapping screw 54 (FIG. 3) which serves to secure the fill tube 26 in assembled relationship with the stamping 51 as shown in FIG. 3.

The connection between the bottom of the sump 40 and the fill tube 26 is rendered fluid tight by providing a washer or gasket 55 (FIG. 3) between the bottom of the sump 40 and the top of the lid 34.

Preferably, the upper edge or margin of the cold water basin 16 is integrally formed so as to provide a continuous downwardly facing groove 60 (FIG. 2) therearound which fits over the conforming upper edge of the housing sidewall 62 as shown in FIG. 2. Accordingly, the cold water basin 16 is supported both from its upper peripheral edge 63 and by the bottom of the sump 40 connected to the cover lid 34.

The reservoir cover lid 34, cold water basin 16 and stamping 51 can each and all be readily produced in commercial quantities at low cost. It will be further appreciated that the stamping 51 can be readily assembled to the underside of the cover 34 by spot welding and the fill tube 26 in turn readily assembled to the underside of the cove 34 by placing the upper end thereof over the semicylindrical flanges 50 and then inserting the screw 54. Likewise, it will be appreciated that the cold water basin 16 can be readily assembled to the lid 34 when the latter is in place on the hot water tank 15 by inserting the hollow bolt 44 downwardly through the opening 41, placing the washer 55 over the protruding end of the bolt and then inserting the bolt shank in the integrally formed sheet metal nut 42 followed by rotation of the bolt head 45 so as to tighten the resulting connection and render it water-tight.

From time to time, depending on the amount of usage and the hardness or softness of the water used in the brewer 10, it is necessary or desirable to service the hot water tank 15 to remove deposits of lime. This can be readily accomplished by removing the sprayhead 28 and top cover 23 and then unscrewing the bolt 44 whereupon the cold water basin 16 can be lifted out through the top opening in the superstructure 13. This allows full access to the cover lid 34 which in turn can be readily removed along with the fill tube 26, heater element 64 (FIG. 3) and hot water siphon tube 27.

What is claimed is:

1. In a coffee brewer having a hot water reservoir equipped with a cover lid and a cold water fill tube having its upper end in fluid flow receiving communication with an opening in said lid and having its lower discharge end located in the lower portion of said reservoir, and a cold water basin mounted above said reservoir and having a drain outlet opening in the bottom thereof in superposed registration with said opening in said lid, the improvement comprising means for removably interconnecting the bottom of said basin to said cover lid, said interconnecting means comprising, a single thread nut integrally formed in the sheet material of said cover lid with an axial length of said nut not exceeding the pitch of said thread, and a tubular bolt having a head which is supported by the material surrounding the upper side of said drain outlet opening and having a threaded tubular shank which has mating threaded engagement with said nut and projects downwardly through said outlet opening and lid.

2. The improvement called for in claim 1 wherein said cover lid is formed of sheet metal.

3. The improvement called for in claim 1 wherein the bottom of said cold water basin includes a sump, said drain outlet is located in the bottom of said sump, and said head of said tubular bolt is seated in said sump.

4. The improvement called for in claim 1 wherein a washer formed of resilient rubber-like material is clamped between said basin and said lid.

5. The improvement called for in claim 1 wherein the upper end of said cold water fill tube is telescopically interfitted with diametrically opposed cylindrical flanges of a support member having diametrically opposed laterally extending flanges secured to the underside of said cover lid.

6. The improvement called for in claim 5 wherein said cover lid and said support member are formed of sheet metal and said laterally extending flanges are spot welded to the underside of said cover lid.

* * * * *